United States Patent [19]

Corle

[11] Patent Number: 6,079,701
[45] Date of Patent: Jun. 27, 2000

[54] GLASS CUTTER'S TABLE

[76] Inventor: John R. Corle, 1428 E. High St., Charlottesville, Va. 22901

[21] Appl. No.: 09/317,736

[22] Filed: May 24, 1999

[51] Int. Cl.⁷ .................................................. C03B 33/03
[52] U.S. Cl. ............................ 269/22; 269/289; 225/96.5
[58] Field of Search ............................... 225/96.5, 94, 93, 225/104, 2, 1, 96, 97, 112, 103, 23, 27, 7; 269/22, 289

[56] References Cited

U.S. PATENT DOCUMENTS

| | | | |
|---|---|---|---|
| 3,693,852 | 9/1972 | Simomura | 225/93 |
| 3,742,794 | 7/1973 | Rupprecht et al. | 225/96.5 |
| 3,743,149 | 7/1973 | Groppe | 225/96.5 |
| 4,948,025 | 8/1990 | Lisec | 225/104 |
| 5,165,585 | 11/1992 | Lisec | 225/96.5 |

*Primary Examiner*—Rinaldi I. Rada
*Assistant Examiner*—Kim Ngoc Tran
*Attorney, Agent, or Firm*—Norman B. Rainer

[57] ABSTRACT

A glass cutter's table for controllably breaking glass sheets along straight lines includes a supported rigid panel having intersecting first and second arrays of downwardly recessed parallel elongated straight grooves. Pneumatically expandable tubing having a braided sleeve is disposed within the grooves and connected to a valve-controlled source of pressurized gas. When inflated, the tubing protrudes above the top surface of the panel. The tubing is of sufficiently thin walled construction that the weight of an overlying sheet of glass compacts the deflated tubing to a thickness of about twice the wall thickness of the tubing.

9 Claims, 4 Drawing Sheets

GLASS CUTTER'S TABLE

BACKGROUND OF THE INVENTION

1. Field of the Invention

This invention concerns a table having a substantially flat surface having means for causing flat plates of glass to be severed along substantially straight lines.

2. Description of the Prior Art

In the cutting of large pieces of plate glass into pieces of smaller size, a table is employed generally having a horizontally disposed flat working surface. The working surface may be covered with a soft pile carpet and may also be equipped with a glass sheet flotation system wherein pressurized air directed upwardly against the glass enables the sheet to be easily manipulated.

The cutting or breaking of the glass sheet is generally accomplished by first scoring the upper surface of the sheet along a straight line with a hardened scribing tool, then positioning the scored line above fulcrum means such as a breaker bar caused to rise up from the surface of the table. Downward force is then applied upon the extremity of the glass sheet somewhat elevated above the table by virtue of the lifting effect of the breaker bar. Such downward force, which may be applied by an operator or by the weight of the glass, causes the sheet to crack or break along the scored line.

The generally employed breaker bars are usually configured to reside within slots recessed into the working surface. By means of a system of levers, the operator can cause the breaker bars to rise out of their slots to their operational position. However, maintaining the bars in their upwardly deployed functional state requires a reliable locking mechanism.

It is found that, in the course of time and long use, mechanical components that deploy and secure breaking bars become unreliable, or necessitate extra operator time. There is also poor mechanical durability and reliability in tables having a first array of parallel breaker bars and an orthogonally crossing second array of parallel breaker bars. In attempts to reduce inadvertent glass breakage by metal breaker bars, softer breaker bar materials have been tried but result in further problems of durability.

U.S. Pat. No. 3,668,955 to Rupprecht et. al. discloses a glass-breaking table having recessed grooves containing a plurality of hydraulic piston-cylinder assemblies 97 that push breaking bars 91 upwardly into contact with the overlying scored glass plate. Such apparatus for the cutting or breaking of glass plate is of expensive, complex construction, and is subject to failure when any of the multitude of cylinders malfunction.

U.S. Pat. No. 4,946,086 to Suuronen et. al. concerns apparatus for tearing continuous form perforated paper, such as computer-generated paper. The apparatus employs clamping means interactive with an anvil surface to grip the paper. A tensioning hose whose cross-sectional configuration is laterally extended, is contained within a recess in the anvil surface. When inflated, the hose contacts the paper at laterally spaced sites spanning a perforation line to produce a tensioning or stretching effect that tears the paper at the perforation line.

It is accordingly a primary object of the present invention to provide a glass cutter's table for achieving accurate breaking of plate glass along scored straight lines.

It is another object of this invention to provide a glass cutter's table as in the foregoing object having a plurality of fulcrum means controllably deployable from beneath the surface of said table.

It is a further object of the present invention to provide a glass cutter's table of the aforesaid nature having two parallel arrays of fulcrum means in orthogonally intersecting relationship.

It is a still further object of this invention to provide a glass cutter's table of the aforesaid nature which is easy to use, reliable, durable and amenable to low cost manufacture.

These objects and other objects and advantages of the invention will be apparent from the following description.

SUMMARY OF THE INVENTION

The above and other beneficial objects and advantages are accomplished in accordance with the present invention by a glass cutter's table comprising a supported rigid panel of substantially rectangular perimeter having a flat upper surface, a first plurality of parallel elongated grooves downwardly recessed into said panel from said upper surface, and a second plurality of parallel elongated grooves downwardly recessed into said panel from said upper surface and orthogonally disposed to the grooves of said first plurality. Pneumatically expandable tubing is disposed within said grooves and sized such that the tubing, when unexpanded resides below said upper surface, and when expanded protrudes above said upper surface to function as a single straight line fulcrum for breaking plate glass along a straight scored line. Valve means control the flow of pressurized gas to said tubing, and supply means for providing pressurized gas to said tubing.

In preferred embodiments, the grooves of each plurality are equally spaced apart, said spacing ranging from about one to three feet. The pressurized gas is preferably air at pressures ranging from about 5 to 80 psi. The means for supplying pressurized air may be a mechanically driven or hand driven piston-type pump, or may be a cylinder of compressed air equipped with a standard pressure regulator and delivery valve. The effective height at which the expanded tube protrudes above said upper surface may range from about $\frac{1}{8}$" to $\frac{1}{2}$".

The tubing preferably has a circular cross-sectional configuration when fully inflated, and has a wall thickness sufficiently thin that, when the tubing is not pressurized, it collapses or flattens to a non-circular configuration. It is most important that the tubing expands diametrically in a very uniform manner along the entire length when pressurized. It is further desirable that the tubing does not undergo axial elongation upon inflation.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
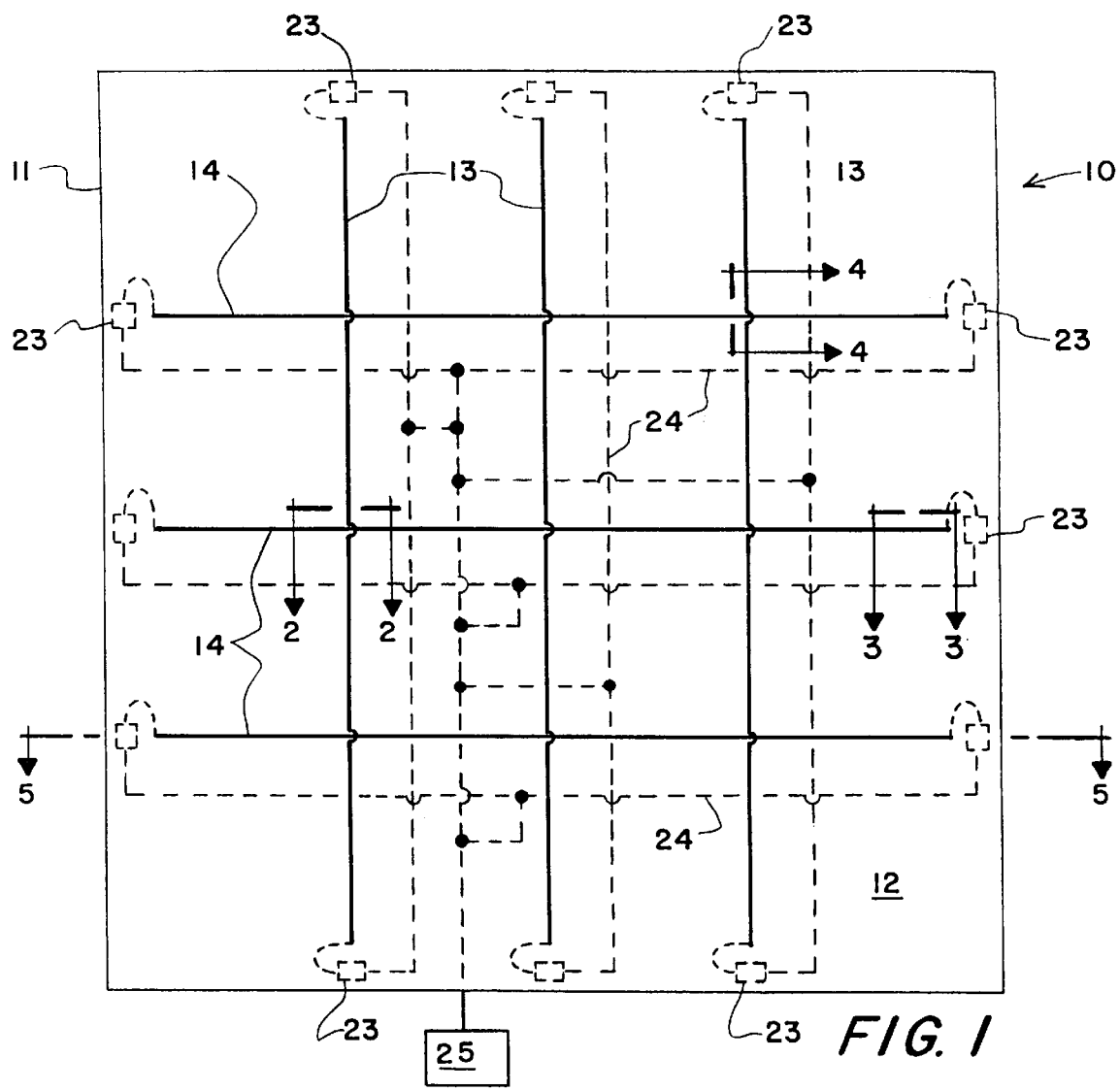
FIG. 1 is a plan view of an embodiment of a glass cutter s table of the present invention including in phantom outline schematic operational features.
Figure 2:
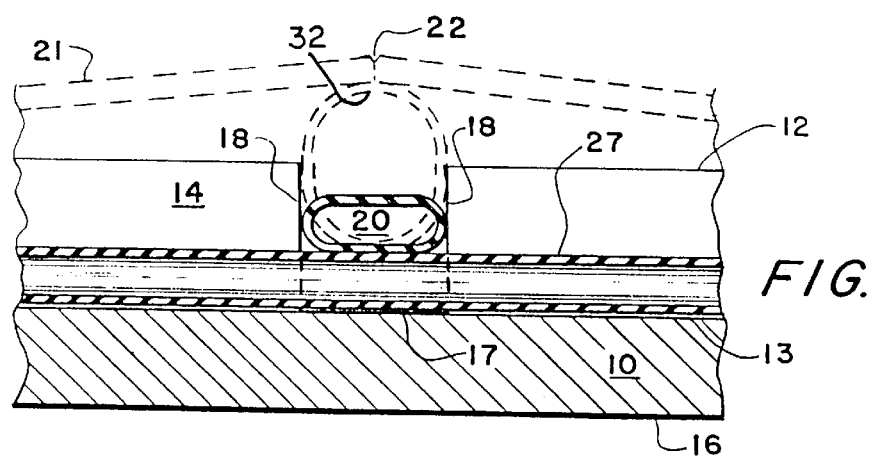
FIG. 2 is an enlarged sectional view taken upon the line 2—2 of FIG. 1.
Figure 3:
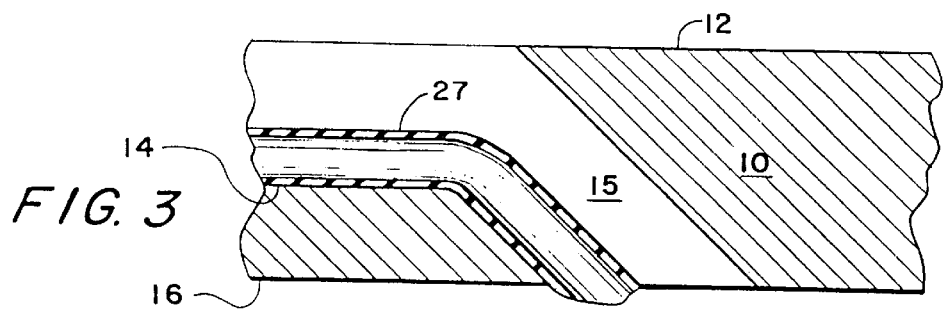
FIG. 3 is an enlarged sectional view taken upon the line 3—3 of FIG. 1.
Figure 4:
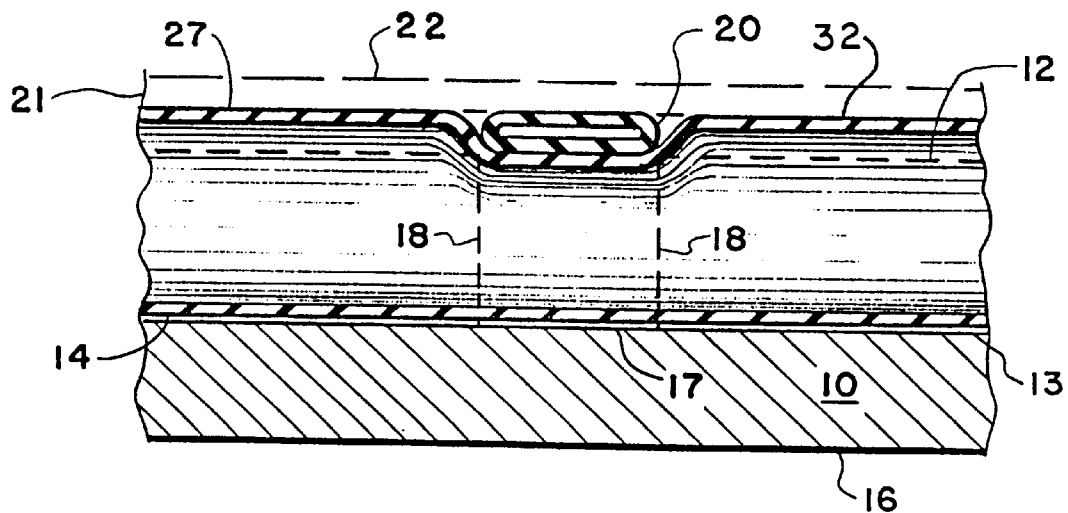
FIG. 4 is an enlarged sectional view taken upon the line 4—4 of FIG. 1 and exemplifying an alternative operational state of the tubing.

Referring to FIGS. 1–5, an embodiment of the glass cutter's table of the present invention is shown comprised of rigid panel 10 having a four-sided rectangular perimeter 11 and flat upper and lower surfaces 12 and 16, respectively. A first plurality of elongated grooves 13 are downwardly recessed into said panel from upper surface 12, said grooves being in parallel disposition to one of the sides of panel 10. A second plurality of elongated grooves 14 are downwardly recessed from said upper surface, and orthogonally disposed to and intersecting grooves 13.

Panel 10 is preferably of wooden construction, having a thickness in the range of about 1–4 inches, and is preferably supported in a horizontal disposition at waist level by legs or other conventional support structure (not shown). The grooves in the illustrated embodiment do not extend completely across panel 10, but instead terminate in passageways 15 that communicate between the upper and lower surfaces of panel 10, said passageways being located adjacent the sides of panel 10. All the grooves are preferably of identical size and configuration, the illustrated grooves being of substantially U-shaped cross-sectional contour, having a flat floor surface 17 perpendicularly joining facing flat sidewalls 18. The width of the grooves, measured between sidewalls 18, may range between about ½" and 1". The height of the grooves, measured between floor surface 17 and upper surface 12, is preferably between 25% and 45% smaller than said width. The grooves of both pluralities are preferably uniformly spaced apart, as shown in the exemplified embodiment.

Pneumatically expandable tubing is frictionally retained within said slots. The tubing 20 retained within said first plurality of grooves crosses the tubing 27 retained within said second plurality of grooves. The nature and dimensions of the tubing is such that, when pressurized with a gas at about 5 to 80 pounds per square inch, the tubing will protrude above upper surface 12 by about ⅛" to ½". When protruding in this manner, the top of the tubing provides a single straight line fulcrum for the breaking of a sheet of glass 21 having a scored line 22.

Tubing for use in the practice of this invention must be thin-walled resilient tubing capable of expanding diametrically but not length-wise (axially) under deformational stress such as provided by a gas confined at superatmospheric pressure. The necessity for the thin wall of the tubing is exemplified in FIG. 4, wherein the underlying tubing 27 within slot 14 is inflated, and the overlying crossing tubing 20 in slots 13 is not inflated. Because tubing 20 is substantially flat where it crosses over tubing 27, it causes minimal disruption of fulcrum line 32 of tubing 27 acting upon the panel of glass 21. The flattened thin walled tubing 20 has a thickness of about twice its wall thickness.

Figure 6:
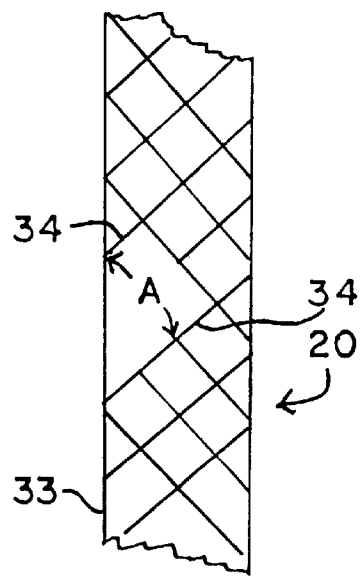
FIG. 6 is a fragmentary plan view of an embodiment of tubing useful in the table of this invention.

Although thin-walled tubing is required in the practice of this invention, it is well known that, when pressurized to a turgid state, such tubing will exhibit non-uniform diametric expansion along its length and in fact will often produce random bubbles or blow-outs. Applicant has discovered that, to overcome the non-uniform diametric expansion problem, and also to provide a tubing that will expand diametrically with substantially no axial elongation, the thin walled tubing should have a braided sheath. As shown in FIG. 6, the sheath, which is preferably of high strength synthetic fibers, is a woven braid structure. It has further been found that the bias angle A of the braid, namely the acute angle defined by the side profile 33 of the tubing and a strand 34 of the braid, should be smaller than about 55 degrees.

Valves 23 of conventional "block and bleed" design may be conveniently located along the perimeter of panel 10 for admitting pressurized gas to or releasing gas from said tubing. Said valves 23 are in turn connected to a manifold system of rigid conduits 24 which receives compressed air from a source of compressed air 25 which may be a pump or cylinder of compressed air equipped with conventional pressure-reducing and regulating means.

Figure 5:
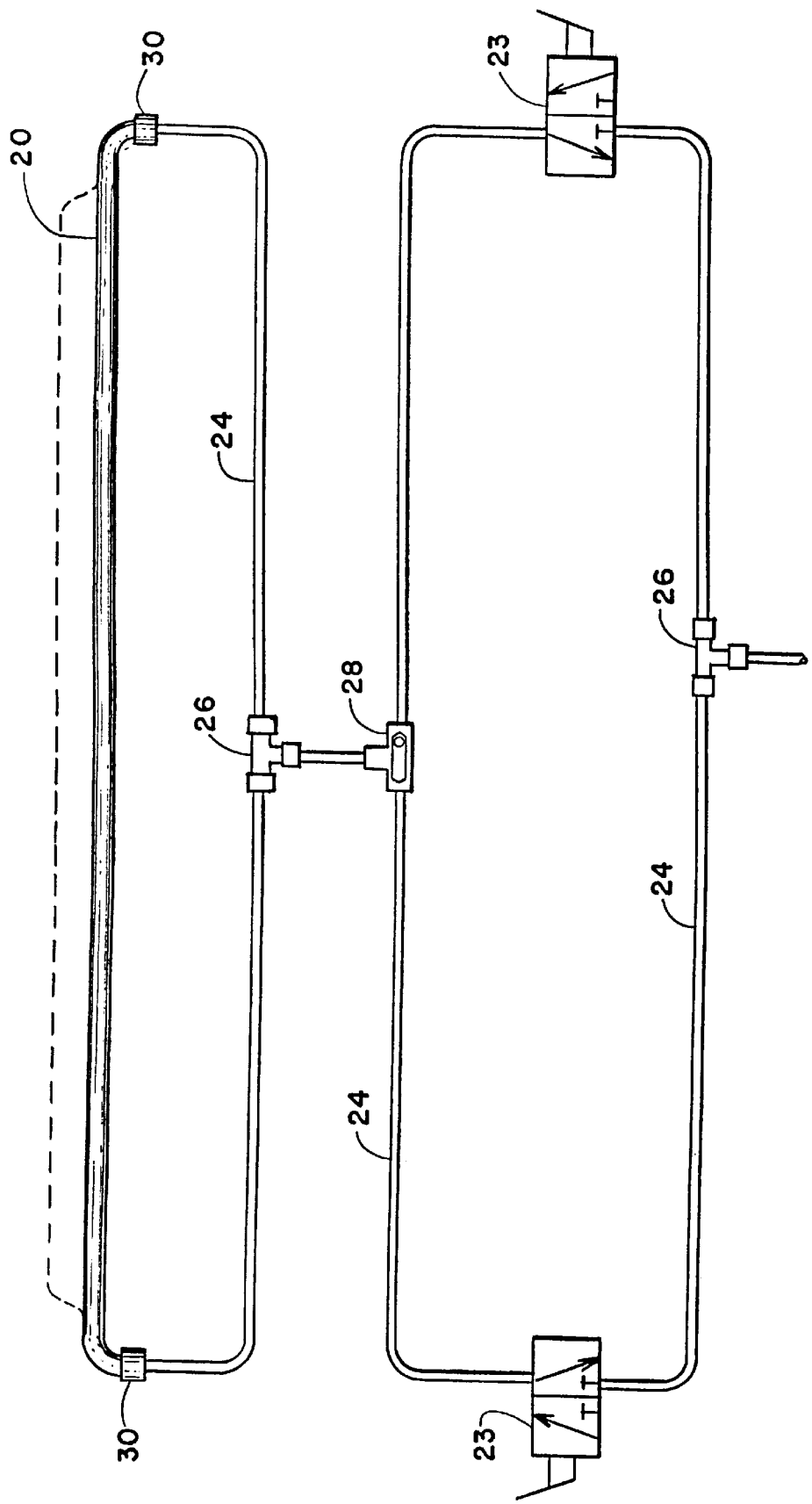
FIG. 5 is an enlarged sectional and schematic view taken upon the line 5—5 of FIG. 1.

As shown in FIG. 5, two-way valves 23 disposed at opposite sides of the table are adapted to operate independently of each other by virtue of intervening shuttle valve 28. This means that the operator can cause inflation of any particular tube in the first or second pluralities of grooves from either side of the table. By turning either valve 23 to its on position, compressed air is delivered from source 25 through lower tee-connector 26, thence through shuttle valve 28, upper tee-connector 26, manifold conduit 24, and finally to tubing 20. The dashed line represents the inflated height of tubing 20. Connector means such as collars 30 may be employed to removably join tubing 20 to manifold conduit 24.

By virtue of the aforesaid components and their manner of interaction, a trouble-free, accurate, and easily operated apparatus is provided for breaking pre-scored glass, while eliminating inadvertent breakage that might occur with earlier used metal breaking bars.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A glass cutter's table comprising a supported rigid panel of substantially rectangular perimeter having a flat upper surface, a first plurality of parallel elongated straight grooves downwardly recessed into said panel from said upper surface, a second plurality of parallel elongated straight grooves downwardly recessed into said panel from said upper surface and orthogonally disposed to the grooves of said first plurality, pneumatically expandable tubing disposed within the grooves of said first and second pluralities of grooves and sized such that said tubing, when unexpanded resides below said upper surface, and when expanded protrudes above said upper surface to function as fulcrum means for breaking plate glass along a straight scored line, and valve means to control the flow of pressurized gas to said tubing.

2. The table of claim 1 wherein said tubing, when pneumatically expanded, protrudes above said upper surface by about ⅛" to ½".

3. The table of claim 1 wherein said valve means enable said tubing to be pneumatically expanded by a worker standing adjacent any side of said rectangular perimeter.

4. The table of claim 1 wherein the height of said grooves is between 25% and 45% smaller than the width of said grooves.

5. The table of claim 1 wherein said tubing is of thin-walled construction whereby, when not expanded, an overlying sheet of glass will compact said tubing to a thickness of about twice the wall thickness of said tubing.

6. The table of claim 1 wherein said tubing, when fully inflated has a circular cross-sectional configuration.

7. The table of claim 6 wherein said tubing is provided with a braided sleeve which causes uniform diametric expansion and minimal axial elongation.

8. The table of claim 7 wherein said braided sleeve is comprised of interwoven fibers having a bias angle smaller than 55 degrees.

9. The table of claim 8 wherein the manner of support of said rigid panel is such as to dispose said panel horizontally.

* * * * *